United States Patent
Iwamoto

(10) Patent No.: US 9,658,500 B2
(45) Date of Patent: May 23, 2017

(54) LIQUID CRYSTAL DISPLAY APPARATUS

(71) Applicant: STANLEY ELECTRIC CO., LTD., Meguro-ku, Tokyo (JP)

(72) Inventor: Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/047,482

(22) Filed: Feb. 18, 2016

(65) Prior Publication Data
US 2016/0266449 A1 Sep. 15, 2016

(30) Foreign Application Priority Data
Mar. 11, 2015 (JP) .................................. 2015-048740

(51) Int. Cl.
*G02F 1/1343* (2006.01)
*G02F 1/1337* (2006.01)

(52) U.S. Cl.
CPC ...... *G02F 1/134309* (2013.01); *G02F 1/1337* (2013.01); *G02F 1/1343* (2013.01); *G02F 1/133707* (2013.01); *G02F 2001/133742* (2013.01); *G02F 2001/134345* (2013.01)

(58) Field of Classification Search
None
See application file for complete search history.

(56) References Cited

U.S. PATENT DOCUMENTS

| | | | | |
|---|---|---|---|---|
| 5,309,264 A | * | 5/1994 | Lien | G02F 1/134336 349/130 |
| 6,285,431 B2 | * | 9/2001 | Lyu | G02F 1/133707 349/129 |
| 6,816,223 B2 | * | 11/2004 | Sugiyama | G02F 1/133707 349/129 |
| 7,714,968 B2 | * | 5/2010 | Iwamoto | G02F 1/133707 349/129 |
| 2002/0001058 A1 | * | 1/2002 | Wang | G02F 1/1393 349/129 |
| 2003/0011729 A1 | * | 1/2003 | Song | G02F 1/133707 349/107 |

(Continued)

FOREIGN PATENT DOCUMENTS

| JP | 2004252298 A | 9/2004 |
|---|---|---|
| JP | 2007256300 A | 10/2007 |
| JP | 2008129050 A | 6/2008 |

*Primary Examiner* — Ryan Crockett
(74) *Attorney, Agent, or Firm* — Holtz, Holtz & Volek PC

(57) ABSTRACT

To decrease graininess in a display surface. First openings comprise third openings each having a first area that extends at a −45 degree angle, and a second area that extends vertically, and fourth openings each having a first area that extends at a 45 degree angle, and a second area that extends vertically. Second openings comprise fifth openings each having a first area that extends at a 45 degree angle, and a second area that extends vertically, and sixth openings each having a first area that extends at a −45 degree angle, and a second area that extends vertically. The third and the fifth openings are disposed along horizontally so that one third opening and one fifth opening adjacent to each other overlap. The fourth and the sixth openings are disposed along horizontally so that a part of one fourth opening and one sixth opening adjacent to each other overlap.

4 Claims, 13 Drawing Sheets

(56) References Cited

U.S. PATENT DOCUMENTS

| | | | | |
|---|---|---|---|---|
| 2005/0253990 A1* | 11/2005 | Song | ................ | G02F 1/133707 349/145 |
| 2007/0002194 A1* | 1/2007 | Shin | ................ | G02F 1/133707 349/38 |
| 2007/0076157 A1* | 4/2007 | Wang | ................ | G02F 1/133707 349/143 |
| 2011/0216280 A1* | 9/2011 | Itou | ................ | G02F 1/134363 349/143 |
| 2012/0147302 A1* | 6/2012 | Nakagawa | ........ | G02F 1/133707 349/96 |
| 2012/0162589 A1* | 6/2012 | Yoso | ................ | G02F 1/134363 349/126 |
| 2013/0093987 A1* | 4/2013 | Kang | ................ | G02F 1/134309 349/141 |
| 2015/0055076 A1* | 2/2015 | Iwamoto | ........... | G02F 1/133707 349/139 |
| 2015/0192817 A1* | 7/2015 | Iwamoto | ........... | G02F 1/134327 349/142 |
| 2015/0261049 A1* | 9/2015 | Iwamoto | ........... | G02F 1/133707 349/147 |

* cited by examiner

Fig.13 — PRIOR ART —
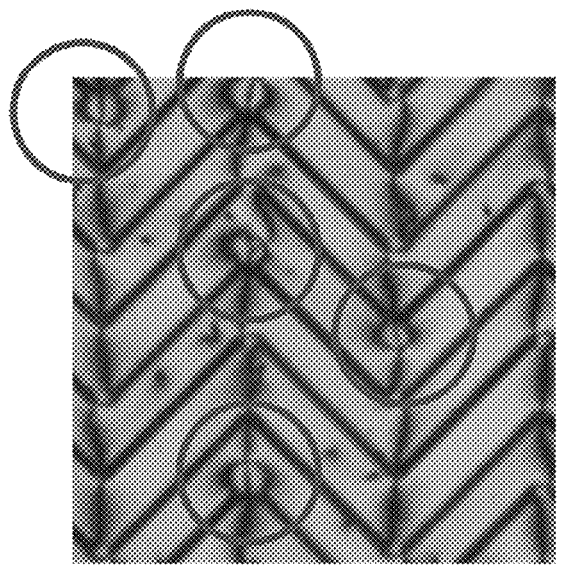

LIQUID CRYSTAL DISPLAY APPARATUS

BACKGROUND OF THE INVENTION

Field of the Invention

The present invention relates to a vertical alignment liquid crystal display apparatus.

Description of the Background Art

There are known vertical alignment liquid crystal display apparatuses comprising substrates that are disposed facing each other, and a vertical alignment type liquid crystal layer provided between these substrates. Such a vertical alignment liquid crystal display apparatus has substantially zero retardation in the liquid crystal layer, making it possible to achieve a high-contrast normally black display using two polarizers arranged in a crossed-Nicol alignment.

Japanese Patent Laid-Open No. 2004-252298 (Patent Document 1) discloses a vertical alignment liquid crystal display apparatus comprising a display part having any shape, the liquid crystal display apparatus being provided with a plurality of openings in each electrode constituting the display part. Specifically, the openings provided to the electrodes of the upper and lower substrates are each formed into a rectangular shape that is long and narrow along one direction, and the openings of the upper substrate and the openings of the lower substrate are alternately disposed along a short direction of the openings in a planar view. The provision of such openings makes it possible to form a dual-domain alignment in which the inclination directions of the liquid crystal molecules in the liquid crystal layer differ from each other by 180 degrees when a voltage greater than or equal to a threshold voltage has been applied to the liquid crystal layer. As a result, viewing angle characteristics during a light display are improved, and a liquid crystal display apparatus having excellent display quality is achieved.

Japanese Patent Laid-Open No. 2007-256300 (Patent Document 2) discloses a liquid crystal display apparatus provided with a plurality of first openings and a plurality of second openings respectively disposed in the electrodes of the upper and lower substrates so that longitudinal directions thereof are substantially orthogonal to each other. In this liquid crystal display apparatus, two polarizers arranged in a crossed-Nicol alignment are disposed sandwiching the upper and lower substrates, and absorption axes of the polarizers are disposed so as to form a substantially 45 degree angle in both a longitudinal direction of the first openings and a longitudinal direction of the second openings described above. Then, the first openings and the second openings of the respective openings of the upper and lower substrates are alternately arranged along the absorption axis direction of one of the polarizers in the planar view. The provision of such a plurality of openings makes it possible to form a quadruple-domain alignment in which liquid crystal molecules in the liquid crystal layer incline in four different directions when a voltage greater than or equal to a threshold voltage has been applied to the liquid crystal layer. As a result, a light display state that is uniform from all directions is achieved, and a liquid crystal display apparatus having viewing angle characteristics that are further improved than those of the liquid crystal display apparatus having the dual-domain alignment described above is achieved.

Japanese Patent Laid-Open No. 2008-129050 (Patent Document 3) discloses a liquid crystal display apparatus in which arrangement pitches of the first openings and the second openings of the liquid crystal display apparatus in Patent Document 2 described above are shifted by a half pitch.

According to such a configuration, a distance between a first opening and a second opening disposed closest can be further increased, making it possible to decrease the possibility of increased electrode resistance and disconnection, and achieve favorable viewing angle characteristics by the quadruple-domain alignment.

However, a vertical alignment liquid crystal display apparatus may be fabricated on the basis of the prior art disclosed in Patent Document 3 described above and result in observation of a graininess in a display surface during a light display. Such a graininess decreases the display quality of the liquid crystal display apparatus, and thus improvement is desired.

It is therefore an object of the specific aspects according to the present invention to decrease a graininess in a display surface of a vertical alignment liquid crystal display apparatus comprising a plurality of openings, and improve a display quality.

SUMMARY OF THE INVENTION

The liquid crystal display apparatus according to an aspect of the present invention is a liquid crystal display apparatus comprising (a) a first substrate and a second substrate disposed facing each other, (b) a first electrode provided to the first substrate, (c) a second electrode provided to the second substrate, and (d) a vertical alignment type liquid crystal layer provided between the first substrate and the second substrate, wherein: (e) the first electrode comprises a plurality of first openings and the second electrode comprises a plurality of second openings, (f) the plurality of first openings comprises a plurality of third openings each having a first area that extends in a direction 45 degrees clockwise in relation to a first direction, and a second area that extends in a second direction orthogonal to the first direction, in a planar view; and a plurality of fourth openings each having a first area that extends in a direction 45 degrees counterclockwise in relation to the first direction, and a second area that extends in the second direction, in the planar view, (g) the plurality of second openings comprises a plurality of fifth openings each having a first area that extends in a direction 45 degrees counterclockwise in relation to a first direction, and a second area that extends in the second direction, in a planar view; and a plurality of sixth openings each having a first area that extends in a direction 45 degrees clockwise in relation to the first direction, and a second area that extends in the second direction, in the planar view, (h) the plurality of third openings and the plurality of fifth openings are alternately disposed at a predetermined interval along the first direction so that the second areas of one third opening and one fifth opening adjacent to each other overlap, in the planar view, (i) the plurality of fourth openings and the plurality of sixth openings are alternately disposed at a predetermined interval along the first direction so that the second areas of one fourth opening and one sixth opening adjacent to each other overlap, in the planar view, (j) a column along the first direction formed by the plurality of third openings and the plurality of fifth openings, and a column along the first direction formed by the plurality of fourth openings and the plurality of sixth openings are disposed adjacent to each other in the second direction.

Preferably, in the liquid crystal display apparatus of this aspect, the plurality of third openings and the plurality of fifth openings are disposed so that ends of the first areas of one third opening and one fifth opening adjacent to each other overlap, in the planar view, and the plurality of fourth openings and the plurality of sixth openings are disposed so that ends of the first areas of one third opening and one fifth opening adjacent to each other overlap, in the planar view.

The liquid crystal display apparatus according to another aspect of the present invention is a liquid crystal display apparatus comprising (a) a first substrate and a second substrate disposed facing each other, (b) a first electrode provided to the first substrate, (c) a second electrode provided to the second substrate, and (d) a vertical alignment type liquid crystal layer provided between the first substrate and the second substrate, wherein: (e) the first electrode comprises a plurality of first openings and the second electrode comprises a plurality of second openings, (f) the plurality of first openings each include a first area that extends in a direction 45 degrees clockwise in relation to a second direction, a second area that extends in a direction 45 degrees counterclockwise in relation to the second direction, and two third areas that extend in the second direction, in a planar view, one end of the first area and one end of the second area being connected to each other, one of the third areas being connected to the other end of the first area, and one of the third areas being connected to the other end of the second area, (g) the plurality of second openings each include a first area that extends in a direction 45 degrees clockwise in relation to a second direction, a second area that extends in a direction 45 deuces counterclockwise in relation to the second direction, and two third areas that extend in the second direction, in a planar view, one end of the first area and one end of the second area being connected to each other, one of the third areas being connected to the other end of the first area, and one of the third areas being connected to the other end of the second area, (h) the plurality of first openings and the plurality of second openings are disposed in a check pattern in the planar view, disposed by shifting arrangement pitches in the first direction by a half pitch from each other, and alternately disposed at a predetermined interval along the first direction so that the third areas of each first opening and second opening adjacent to each other overlap.

Preferably, in the liquid crystal display apparatus of this aspect, the plurality of first openings comprises a fourth area that extends in the second direction, the fourth area being connected to the one end of the first area and the one end of the second area, and the plurality of second openings comprises a fourth area that extends in the second direction, the fourth area being connected to the one end of the first area and the one end of the second area.

According to each of the above described configurations, it is possible to decrease a graininess in a display surface of a vertical alignment liquid crystal display apparatus comprising a plurality of openings, and improve a display quality.

BRIEF DESCRIPTION OF THE DRAWINGS

FIG. 13 is an image illustrating a microscope observation image of the display part during a light display of the vertical alignment liquid crystal display apparatus fabricated on the basis of the prior art according to Patent Document 3 (configuration according to FIG. 8 of Patent Document 3).

DESCRIPTION OF THE PREFERRED EMBODIMENTS

The present inventor conducted a detailed investigation on the graininess within the display surface of the vertical alignment liquid crystal display apparatus on the basis of the prior art according to Patent Document 3. FIG. 13 is an image illustrating a microscope Observation image of the display part during a light display of the vertical alignment liquid crystal display apparatus fabricated on the basis of the prior art according to Patent Document 3 (configuration according to FIG. 8 of Patent Document 3). As illustrated in FIG. 13, in this liquid crystal display apparatus, a dark line (a dark region) is observed in a section in which an end of an opening having a longitudinal direction directed in a direction 45 degrees clockwise with respect to a left-right direction of the paper surface, and an end of an opening having the longitudinal direction directed in a direction 45 degrees counterclockwise are adjacent to each other. With this dark line serving as a boundary, a dual domain in which the alignment directions of the liquid crystal molecules differ by 180 degrees is achieved, and the alignments of the liquid crystal molecules in this section conceivably continually rotate within the substrate surface.

When FIG. 13 is carefully observed, the shapes of the dark lines that occur in the sections in which the ends of the openings are adjacent to each other are found to be various, such as curved shapes and elliptical shapes (refer to the locations circled in the image). Further, such dark lines do not always occur. That is, the occurrence location and the shape of the dark lines are irregular, and this irregularity is presumed to be the cause of the occurrence of the graininess in the appearance of the display part of the liquid crystal display apparatus. Based on the above investigation, the inventor was inspired by the fact that suppressing the occurrence of dark lines such as described above can decrease the graininess in the appearance of the display part, and thus created the present invention. The following describes embodiments of the present invention with reference to drawings.

First Embodiment

Figure 1:
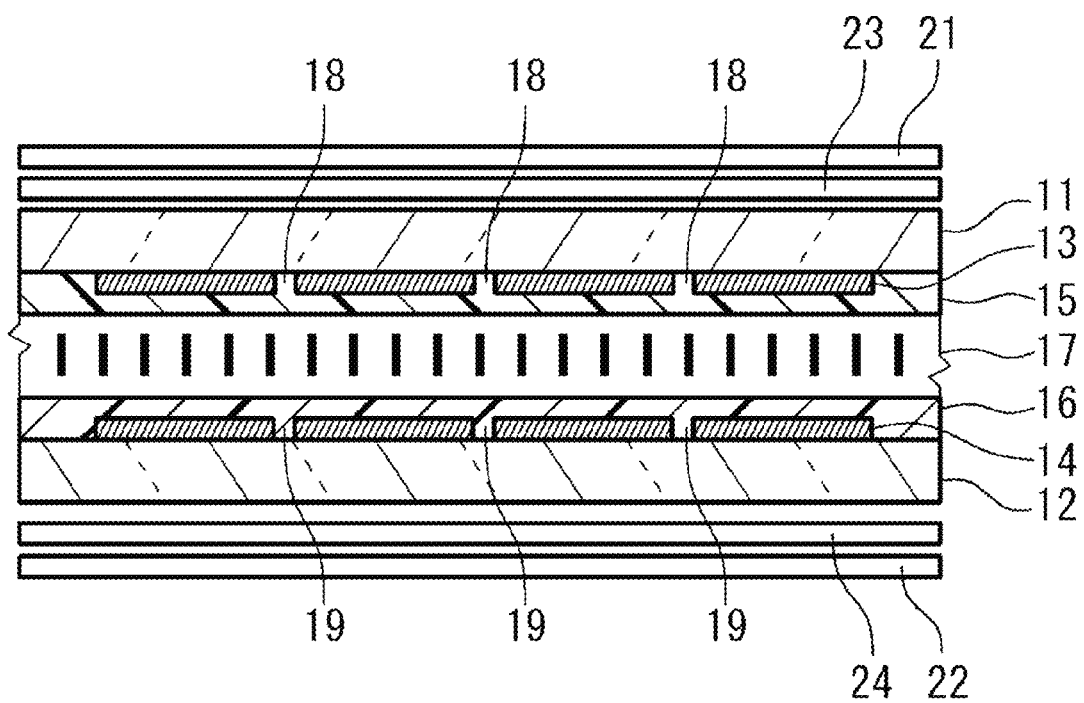
FIG. 1 is a cross-sectional view showing the basic structure of the liquid crystal display apparatus of the first embodiment.

FIG. 1 is a cross-sectional view showing the basic structure of the liquid crystal display apparatus of the first embodiment. This liquid crystal display apparatus comprises a first substrate 11 and a second substrate 12 disposed facing each other, a first electrode 13 provided to the first substrate 11, a second electrode 14 provided to the second substrate 12, and a liquid crystal layer 17 disposed between the first substrate 11 and the second substrate 12, as a basic configuration. For example, the liquid crystal display apparatus of this embodiment is configured so that the region where the electrodes overlap each other forms the characters and designs that the user wants to display, is basically capable of displaying only predetermined characters and the like, and is a segment display type liquid crystal display apparatus wherein generally a region of about 50% or less in terms of the area ratio inside the effective display region contributes to the display of characters and the like. Note that the liquid crystal display apparatus may be a dot matrix display type wherein a plurality of pixels is arranged in a matrix pattern, or may include both a segment display type and a dot matrix display type.

The first substrate 11 and the second substrate 12 are each a transparent substrate, such as a glass substrate, plastic substrate, or the like, for example. As shown, the first substrate 11 and the second substrate 12 are bonded together with a predetermined gap (approximately 4 μm, for example) therebetween.

The first electrode 13 is provided to one surface side of the first substrate 11. Similarly, the second electrode 14 is provided to one surface side of the second substrate 12. The first electrode 13 and the second electrode 14 are each configured by suitably patterning a transparent conductive film, such as indium-tin oxide (ITO), for example. A plurality of openings 18 is provided to the first electrode 13 and a plurality of openings 19 is provided to the second electrode 14. Each region where the first electrode 13 and the second electrode 14 overlap as described above constitutes one segment display part or pixel. Then, the plurality of first openings 18 and the plurality of second openings 19 are disposed in each segment display part or pixel.

A first alignment film 15 is provided to one surface side of the first substrate 11 so as to cover the first electrode 13. A second alignment film 16 is provided to one surface side of the second substrate 12 so as to cover the second electrode 14. A vertical alignment film that restricts the alignment of the liquid crystal layer 17 to a vertical alignment is used as the first alignment film 15 and the second alignment film 16. A uniaxial alignment process such as a rubbing process is not performed on either of the alignment films 15 or 16.

The liquid crystal layer 17 is provided between the first substrate 11 and the second substrate 12. In this embodiment, the liquid crystal layer 17 is configured using a liquid crystal material with a negative dielectric anisotropy $\Delta \epsilon$. The bold lines shown in the liquid crystal layer 17 schematically indicate the direction of alignment of the liquid crystal molecules in the liquid crystal layer 17. The liquid crystal layer 17 of this embodiment is set in a vertical alignment in which the direction of alignment of the liquid crystal molecules when a voltage is not applied is vertical with respect to each substrate surface of the first substrate 11 and the second substrate 12.

A first polarizer 21 is disposed on the outside of the first substrate 11. Similarly, a second polarizer 22 is disposed on the outside of the second substrate 12. The first polarizer 21 and the second polarizer 22 are disposed so that the respective absorption axes are substantially perpendicular to each other, for example. Further, an optical compensator, such as a C plate, may be suitably disposed between each polarizer and each substrate. For example, according to this embodiment, optical compensators 23 and 24 are disposed between the first substrate 11 and the first polarizer 21, and between the second substrate 12 and the second polarizer 22, respectively.

Figures 2A, 2B:
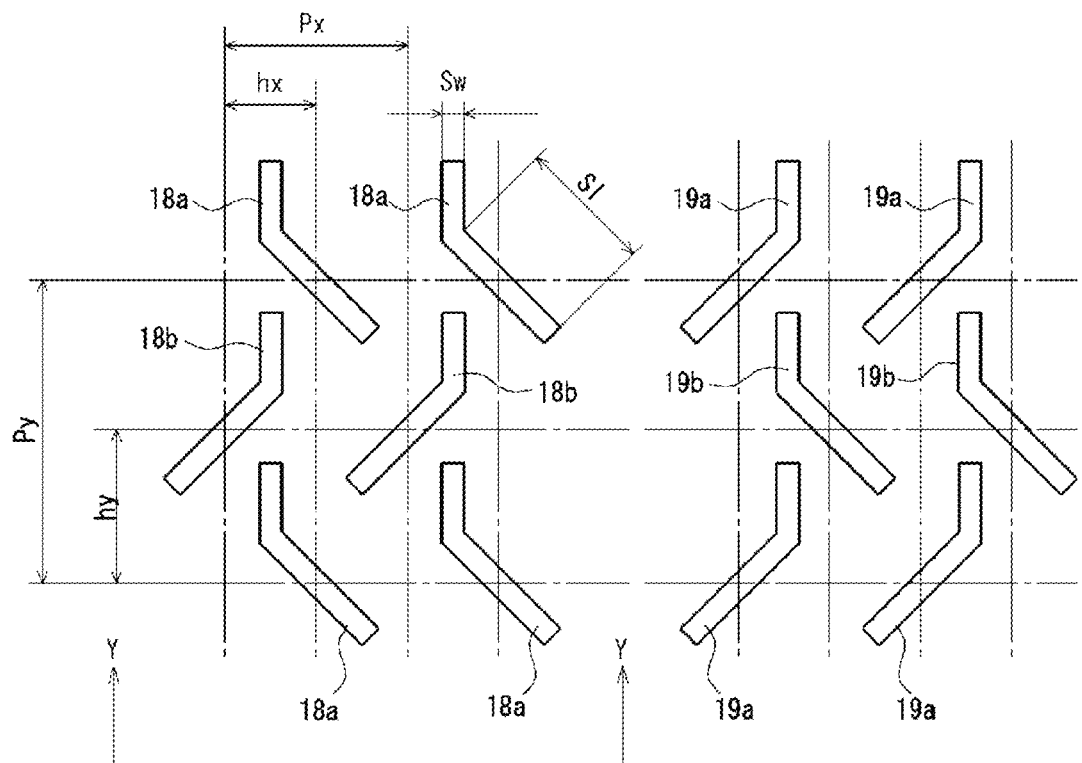
FIG. 2A is a plan view illustrating the structure of the first openings.
FIG. 2B is a plan view illustrating the structure of the second openings.
Figure 2C:
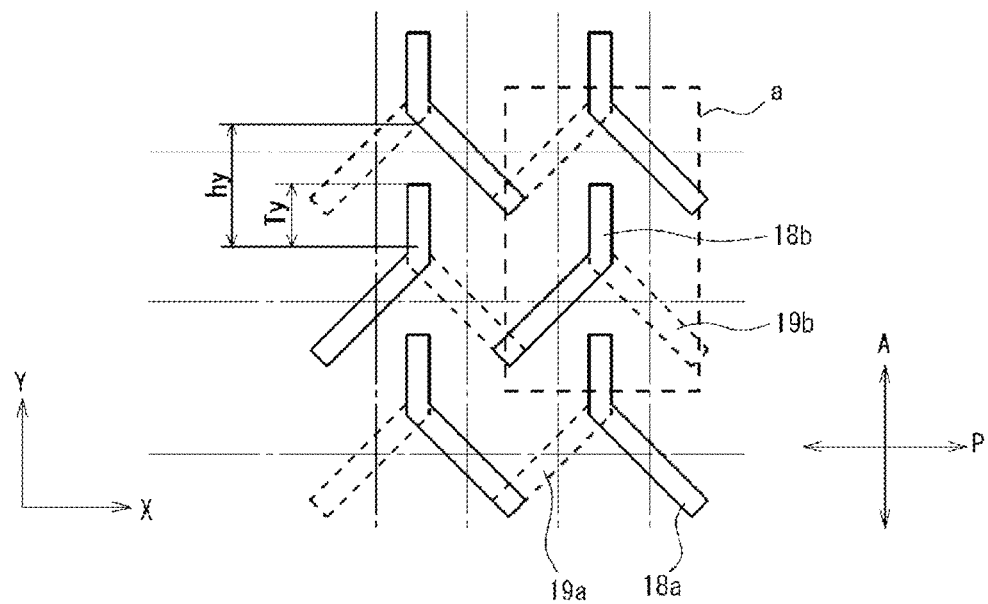
FIG. 2C is a plan view illustrating the first openings and the second openings overlapped.

FIGS. 2A to 2C are plan views for illustrating the structure of each opening. Specifically, FIG. 2A is a plan view illustrating the structure of the first openings, FIG. 2B is a plan view illustrating the structure of the second openings, and FIG. 2C is a plan view illustrating the first openings and the second openings overlapped. It should be noted that each of these drawings is a plan view as viewed from the first substrate 11 side, and illustrates a few of the many openings that exist.

As illustrated in FIG. 2A, the plurality of the first openings 18 comprises a plurality of openings (third openings) 18a and a plurality of openings (fourth openings) 18b. The openings 18a are arranged at a constant pitch Px in the X direction in the drawing, and at a constant pitch Py along the Y direction in the drawing. Similarly, the openings 18b are arranged at a constant pitch Px in the X direction in the drawing, and at a constant pitch Py along the Y direction in the drawing. Columns with the openings 18a adjacent to each other, and columns with the openings 18b adjacent to each other are formed in the X direction. Conversely, columns with the openings 18a and the openings 18b alternately adjacent to each other are formed in the Y direction.

The openings 18a and the openings 18b are linearly symmetrical. Specifically, the openings 18a each comprise a substantially rectangular first area that extends in a direction 45 degrees clockwise in relation to the X direction, and a substantially rectangular second area that extends parallel to the Y direction, and one end on an upper side in the drawing of the first area and one end on a lower side in the drawing of the second area are connected. As a result, the openings 18a each have an overall shape that is bent into a rightward V. On the other hand, the openings 18b each comprise a substantially rectangular first area that extends in a direction 45 deuces counterclockwise in relation to the X direction, and a substantially rectangular second area that extends parallel to the Y direction, and one end on an upper side in the drawing of the first area and one end on a lower side in the drawing of the second area are connected. As a result, the openings 18b each have an overall shape that is bent into a leftward V.

As illustrated in FIG. 2B, the plurality of the second openings 19 comprises a plurality of openings (fifth openings) 19a and a plurality of openings (sixth openings) 19b. The openings 19a are arranged at a constant pitch Px in the X direction in the drawing, and at a constant pitch Py along the Y direction in the drawing. Similarly, the openings 19b are arranged at a constant pitch Px in the X direction in the drawing, and at a constant pitch Py along the Y direction in the drawing. Columns with the openings 19a adjacent to each other, and columns with the openings 19b adjacent to each other are formed in the X direction. Conversely, columns with the openings 19a and the openings 19b alternately adjacent to each other are formed in the Y direction.

The openings 19a and the openings 19b are linearly symmetrical. Specifically, the openings 19a each comprise a substantially rectangular first area that extends in a direction 45 degrees counterclockwise in relation to the X direction, and a substantially rectangular second area that extends parallel to the Y direction, and one end on an upper side in the drawing of the first area and one end on a lower side in the drawing of the second area are connected. As a result, the openings 19a each have an overall shape that is bent into a leftward V. On the other hand, the openings 19b each comprise a substantially rectangular first area that extends in a direction 45 degrees clockwise in relation to the X direction, and a substantially rectangular second area that extends parallel to the Y direction, and one end on an upper side in the drawing of the first area and one end on a lower side in the drawing of the second area are connected. As a result, the openings 19b each have an overall shape that is bent into a rightward V.

As illustrated in FIG. 2C, the openings 18a and the openings 19a are disposed so that the respective second areas of one of the openings 18a and one of the openings 19a overlap in the planar view, and the longitudinal directions of the respective first areas form a substantially 90 degree angle, thereby forming a substantially inverted Y-shape overall. Then, the openings having a substantially inverted Y-shape in the planar view configured by combining one opening 18a and one opening 19a are arranged along the X direction. Furthermore, in this embodiment, the one opening 18a and one opening 19a that are adjacent to each other are disposed so that the ends of the respective first areas, specifically, the ends on the sides not connected to the second areas, overlap in the planar view.

Similarly, the openings 18b and the openings 19b are disposed so that the respective second areas of one of the openings 18b and one of the openings 19b overlap in the planar view, and the longitudinal directions of the respective first areas form a substantially 90 degree angle, thereby forming a substantially inverted Y-shape overall. Then, the openings having a substantially inverted Y-shape in the planar view configured by combining one opening 18b and one opening 19b are arranged along the X direction. Furthermore, in this embodiment, the one opening 18b and one opening 19b that are adjacent to each other are disposed so that the ends of the respective first areas, specifically, the ends on the sides not connected to the second areas, overlap in the planar view.

Further, columns along the first direction of the substantially inverted Y-shaped openings in the planar view configured by combining one opening 18a and one opening 19a, and columns along the first direction of the substantially inverted Y-shaped openings in the planar view configured by combining one opening 18b and one opening 19b are disposed adjacent to each other in the Y direction. In this embodiment, the second areas of the openings 18a and 19a are disposed at a predetermined spacing from (that is, do not overlap with) the openings 18b and 19b disposed on the upper side in the drawing of these second areas. Similarly, in this embodiment, the second areas of the openings 18b and 19b are disposed at a predetermined spacing from (that is, do not overlap with) the openings 18a and 19a disposed on the upper side in the drawing of these second areas.

Next, the results of analyzing an alignment texture when a voltage has been applied to the liquid crystal display apparatus of this embodiment by a computer simulation will be described. This simulation was conducted by performing three-dimensional analysis using the software "LCDMaster 8.5" manufactured by Shintech, Inc. The calculation region was set as the region a indicated by the rectangular frame in FIG. 2C. This region a was set as a region that is 80 µm both vertically and horizontally. The region a was divided into 40×40 mesh areas, and then subjected to calculations. Further, a thickness (cell thickness) of the liquid crystal layer was set to 4 µm, and the number of segments in the layer thickness direction was set to 20. With an applied voltage set to 4 V (the first electrode and the second electrode being set to 4 V and 0 V, respectively), the three-dimensional alignment distribution in the liquid crystal layer in a steady state was calculated. At this time, the absorption axis of the second polarizer (back-side polarizer) was set parallel to the X direction in FIGS. 2A to 2C, and the absorption axis of the first polarizer (front-side polarizer) was set parallel to the Y direction in FIGS. 2A to 2C. Further, the liquid crystal material that constitutes the liquid crystal layer was a material with a negative dielectric anisotropy $\Delta\epsilon$ of −5.1 and a refractive index anisotropy $\Delta n$ of 0.0914. These calculation conditions are the same as those for the comparison examples and the like described hereinafter.

Figure 3A:
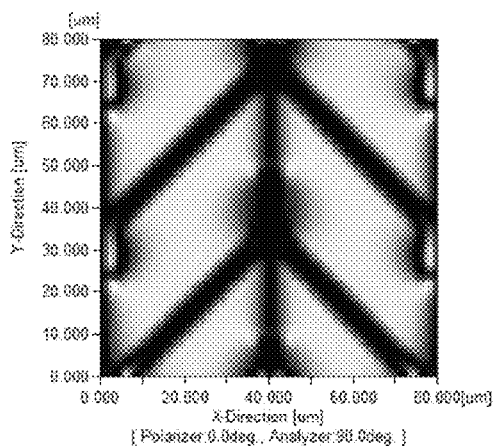
FIG. 3A is an image showing the calculation result of the alignment texture based on certain condition settings.

FIG. 3A is an image showing the calculation result of the alignment texture based on certain condition settings. In this calculation, a slit width Sw (refer to FIG. 2A) of the openings was set to 12 µm, a slit length Sl of the first areas was set to 57 µm, arrangement pitches Px and Py of the openings were each set to 80 µm, half pitches hx and hy of these were each set to 40 µm, and a slit length Ty of the second areas was set to 20 µm, which is one half of hy. As understood upon observation of the area near the center of the alignment texture in FIG. 3A, the occurrence of an elliptical dark line (dark region) such as seen in the liquid crystal display apparatus (refer to FIG. 13) based on the prior art according to Patent Document 3 described above was suppressed by providing the second areas of the openings 18a and 19a on as to overlap and the second areas of the openings 18b and 19b so as to overlap. Thus, according to the liquid crystal display apparatus of this embodiment, the graininess in the appearance of the display part caused by the occurrence of irregular dark lines is decreased, making it possible to improve the display quality.

Figure 3B:
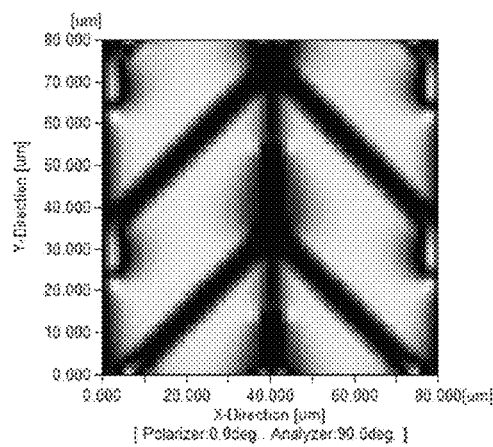
FIGS. 3B to 3D are images showing the calculation result of the alignment textures based on another condition settings respectively.
Figure 3C:
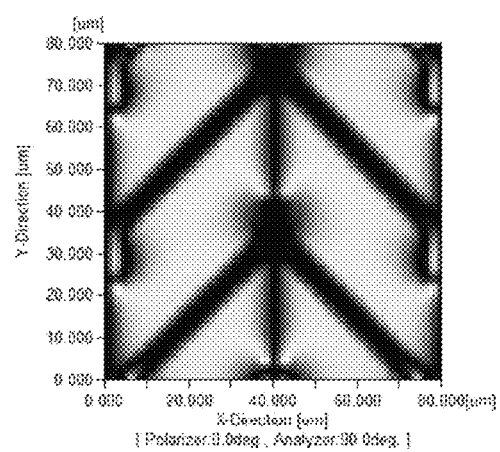
Figure 3D:
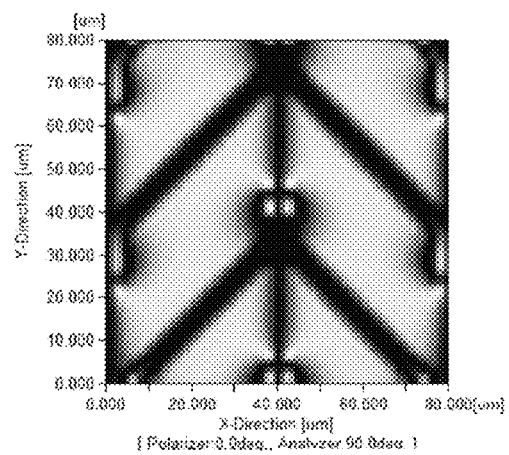

FIGS. 3B to 3D are images showing the calculation results of the alignment textures based on another condition settings respectively. Specifically, in this calculation, a slit length Ty of the second areas was set to 30 μm for the alignment texture illustrated in FIG. 3B, a slit length Ty of the second areas was set to 10 μm for the alignment texture illustrated in FIG. 3C, and a slit length Ty of the second areas was set to 5 μm for the alignment texture illustrated in FIG. 3D. It should be noted that, other than the slit length Ty, the condition settings are the same as those of the alignment texture illustrated in FIG. 3A described above. As understood upon observation of the area near the center of the alignment texture, when Ty was set to 30 μm (refer to FIG. 3B) and when Ty was set to 10 μm (refer to FIG. 3C), the occurrence of elliptical dark lines was suppressed. Conversely, when Ty was set to 5 μm (refer to FIG. 3D), elliptical dark lines occurred. Based on these calculation results, it is apparent that the slit length Ty of the second areas needs to be maintained to a certain degree, and the occurrence of dark lines is suppressed and the graininess in the appearance is decreased if at least Ty is set to 10 μm or greater. Further, from the calculation results, it is apparent that at least the slit length Ty should be set in a range of from 10 μm or greater to 30 μm or less. Further, to provide spacing between adjacent openings on one electrode surface and suppress electrode disconnection, the slit length Ty of the second areas needs to be less than the half pitch hy.

Figure 4:
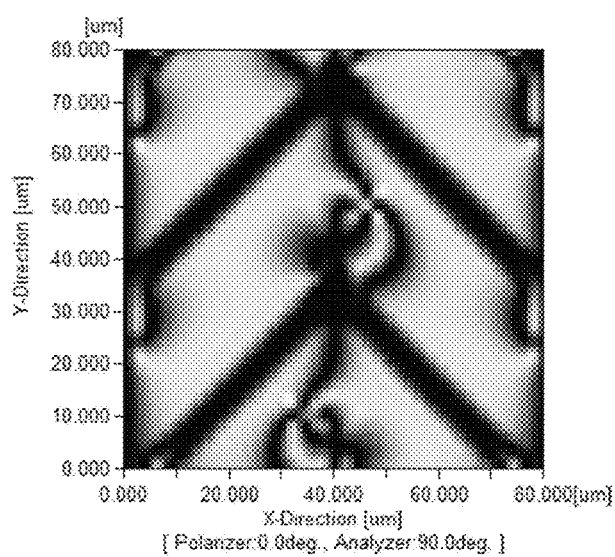
FIG. 4 is an image showing the calculation result of the alignment texture based on the liquid crystal display apparatus of the comparison example 1.

As comparison example 1, a case where the second area was not provided to one of the two openings 18$a$ and 19$a$ and one of the two openings 18$b$ and 19$b$ was analyzed by simulation. FIG. 4 is an image showing the calculation result of the alignment texture based on the liquid crystal display apparatus of this comparison example 1. Here, other than the second area not being provided to one of the openings of each pair, the condition settings used were the same as those for calculating the alignment texture illustrated in FIG. 3A described above. As illustrated, observation of the area near the center of the alignment texture revealed the occurrence of S-shaped dark lines and the occurrence of elliptical dark lines around the S-shaped dark lines. Based on this, it is apparent that, to suppress the graininess in the appearance of the display part, the second area is preferably provided to both of the openings of each pair, and the second areas are preferably disposed overlapping.

Figures 5A, 5B:
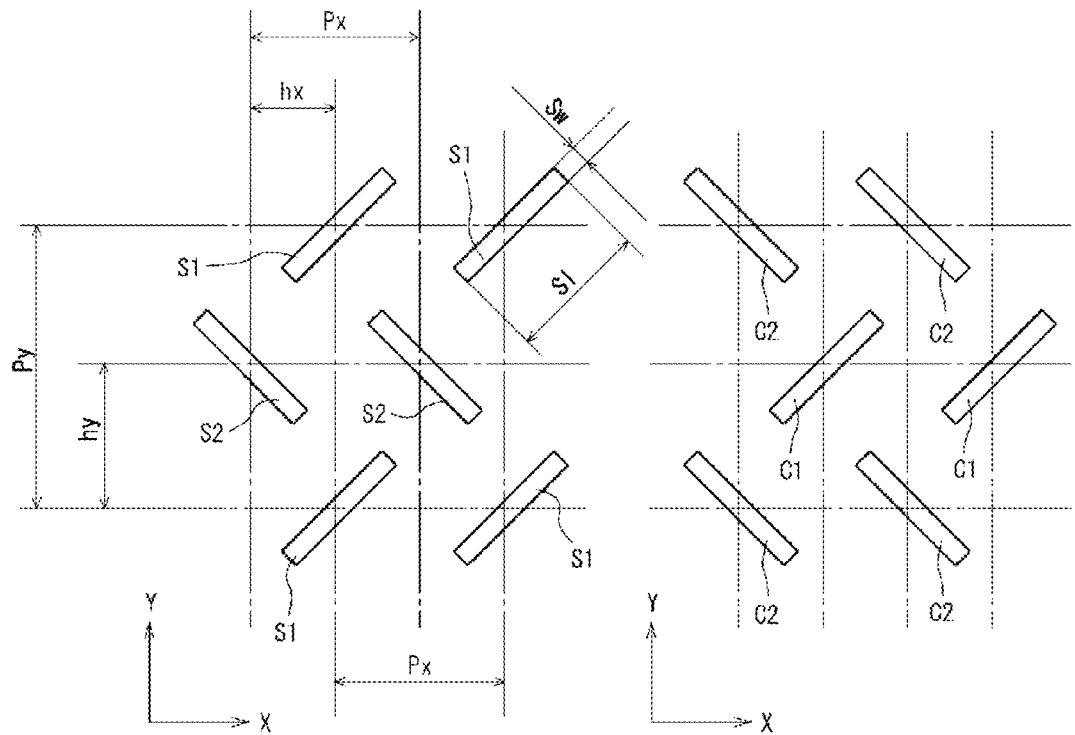
FIG. 5A is a plan view illustrating the structure of the openings provided to the first substrate of the liquid crystal display apparatus of the comparison example 2.
FIG. 5B is a plan view illustrating the structure of the openings provided to the second substrate of the liquid crystal display apparatus of the comparison example 2.
Figure 5C:
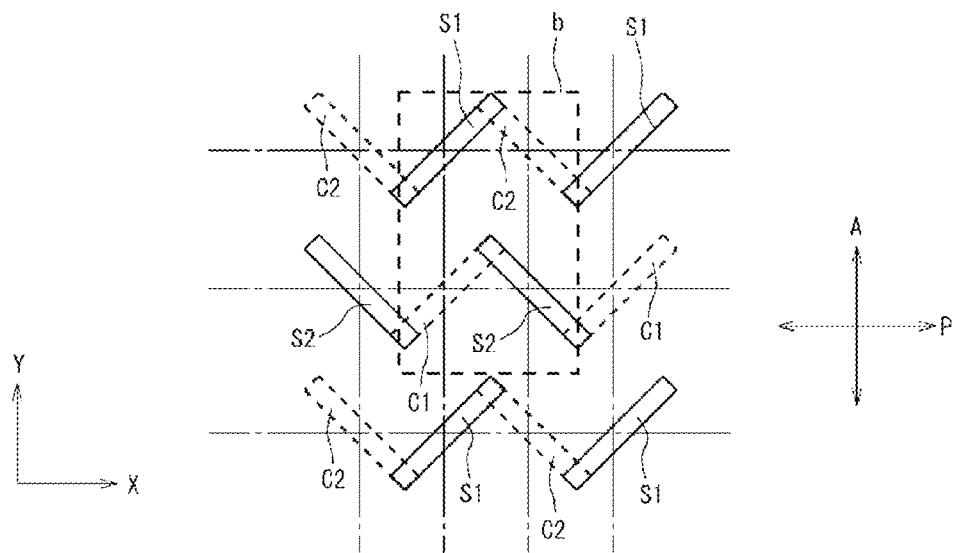
FIG. 5C is a plan view illustrating the openings of the first substrate and the openings of the second substrate overlapped.

As comparison example 2, a case where the second area was not provided to either of the openings 18$a$ and 19$a$ or either of the openings 18$b$ and 19$b$ of the respective pairs in the liquid crystal display apparatus of the first embodiment described above was also analyzed by simulation. FIGS. 5A to 5C illustrate plan views for describing the structure of each of the openings of the liquid crystal display apparatus of this comparison example 2. Specifically, FIG. 5A is a plan view illustrating the structure of the openings provided to the first substrate of the liquid crystal display apparatus of the comparison example 2, FIG. 5B is a plan view illustrating the structure of the openings provided to the second substrate of the liquid crystal display apparatus of the comparison example 2, and FIG. 5C is a plan view illustrating the openings of the first substrate and the openings of the second substrate overlapped. It should be noted that the basic configuration of the liquid crystal display apparatus is the same as that of the first embodiment described above (refer to FIG. 1). And it should be noted that each of these drawings is a plan view as viewed from the first substrate 11 side, and illustrates a few of the many openings that exist.

As illustrated in FIG. 5A, a plurality of openings S1 and a plurality of openings S2 are provided to the first electrode 13 of the first substrate 11. The openings S1 and the openings S2 are each formed into a rectangular shape in the planar view. Then, the openings S1 are each disposed with the longitudinal direction thereof directed in a direction 45 degrees clockwise in relation to the Y direction, and the openings S2 are each disposed with the longitudinal direction thereof directed in a direction 45 degrees counterclockwise in relation to the Y direction. The openings S1 and the openings S2 are both arranged at the pitch Px along the X direction, and at the pitch Py along the Y direction in the drawing. Columns with the openings S1 adjacent to each other, and columns with the openings S2 adjacent to each other are formed in the X direction. Conversely, columns with the openings S1 and the openings S2 alternately adjacent to each other at the pitch hy equivalent to half of the pitch Py are formed in the Y direction. The length Sl of the openings S1 and S2 is defined as a length in the longitudinal direction, and the width Sw is defined as a length in a short direction.

As illustrated in FIG. 5B, a plurality of openings C1 and a plurality of openings C2 are provided to the second electrode 14 of the second substrate 12. The shape and disposed state of the openings C1 are the same as those of the openings S2 described above, and the shape and disposed state of the opening C2 are the same as those of the openings S1 described above, and thus detailed descriptions thereof will be omitted. The lengths and widths of the openings C1 and C2 are the same as those of the openings S1 and S2. However, the widths of the openings S1 and S2 may differ from those of the openings C1 and C2.

As illustrated in FIG. 5C, the openings S1 and the openings C2 are disposed so that the respective longitudinal directions of one opening S1 and one opening C2 form a substantially 90 degree angle and are substantially V-shaped as a whole. Then, the openings having a substantially V shape in the planar view configured by combining one opening S1 and one opening C2 are arranged along the X direction. Furthermore, one opening S1 and one opening C2 adjacent to each other are disposed so that both respective ends overlap each other in the planar view. It should be noted that the openings S2 and the openings C1 are similarly disposed, and therefore a detailed description thereof will be omitted.

Figure 6:
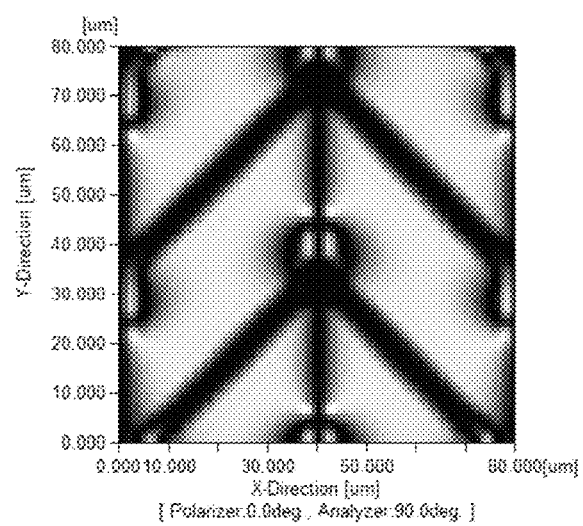
FIG. 6 is an image showing the calculation result of the alignment texture based on certain condition settings of the liquid crystal display apparatus of the comparison example 2.

FIG. 6 is an image showing the calculation result of the alignment texture based on certain condition settings of the liquid crystal display apparatus of the comparison example 2. in this calculation, a slit width Sw of the openings was set to 12 μm, a slit length Sl was set to 57 μm, arrangement pitches Px and Py of the openings were each set to 80 μm, half pitches hx and by of these were each set to 40 μm. And the calculation region was set as the region b indicated by the rectangular frame in 5C. This region b was set as a region that is 80 μm both vertically and horizontally. The region b was divided into 40×40 mesh areas, and then subjected to calculations. As understood upon observation of the area near the center of the alignment texture in FIG. 6, in bent portions (upward or downward convex sections) in which the ends of the openings overlap, the same elliptical dark lines (dark regions) as those seen in the liquid crystal display apparatus (refer to FIG. 13) based on the prior art according to Patent Document 3 described above occur. Here, according to calculation results, the dark lines uniformly occur in the bent portions in which the ends of the openings overlap.

However, as illustrated in FIG. 13 described above, in the liquid crystal display apparatus actually fabricated, dark lines irregularly occur due to causes such as positional displacement and variance in the shapes of the openings, and this irregularity conceivably causes the occurrence of graininess in the appearance of the display part.

Figure 7A:
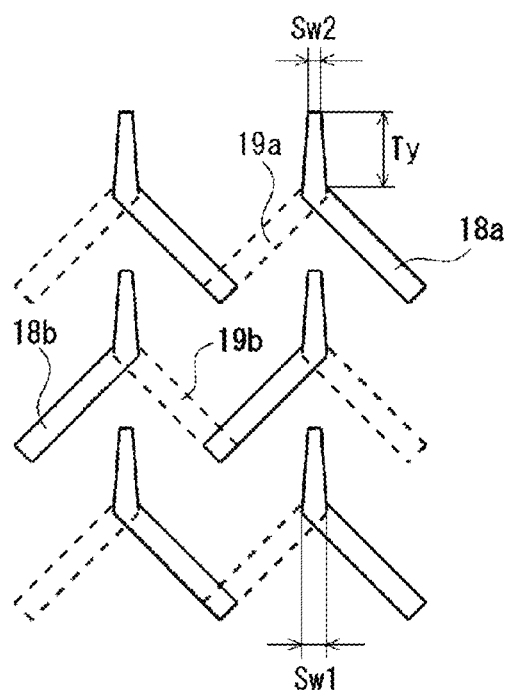
FIGS. 7A and 7B axe respectively a plan view illustrating the structure of the openings of the liquid crystal display apparatus of the modification example.
Figure 7B:
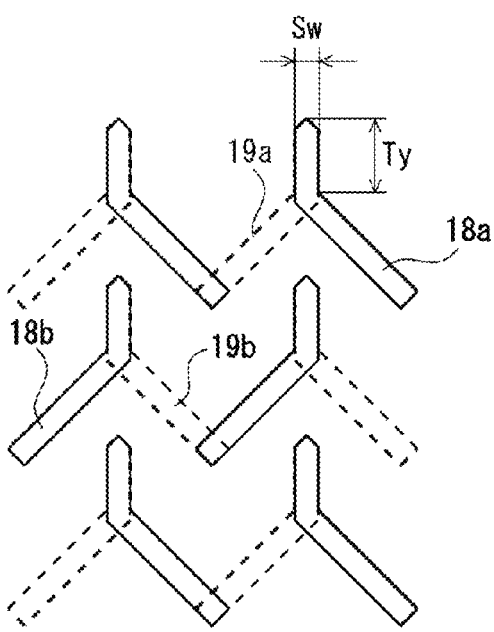

Next, several modification examples according to the liquid crystal display apparatus of the first embodiment will be described. FIGS. 7A and 7B are respectively a plan view illustrating the structure of the openings of the liquid crystal display apparatus of the modification example. It should be noted that the basic configuration of the liquid crystal display apparatus is the same as that of the first embodiment described above (refer to FIG. 1). And it should be noted that each of these drawings is a plan view as viewed from the first substrate 11 side, and illustrates a few of the many openings that exist.

The plurality of openings 18a and the plurality of openings 18b illustrated in FIG. 7A, compared to the openings (refer to FIGS. 2A to 2C) of the first embodiment described above, differ in terms of the shape of the second areas of the openings 18a and the openings 18b. Specifically, while the longitudinal directions of the second areas are similarly disposed in the Y direction, the shape differs in that the slit width gradually changes toward the ends on the side not connected to the first areas of the openings 18a and 18b. In the second areas, a largest slit width is defined as Sw1, a smallest slit width is defined as Sw2, and the slit length is defined as Ty. It should be noted that the difference in the shape of the second areas of the openings 19a and the openings 19b is the same as that of the openings 18a and the openings 18b.

Figure 8A:
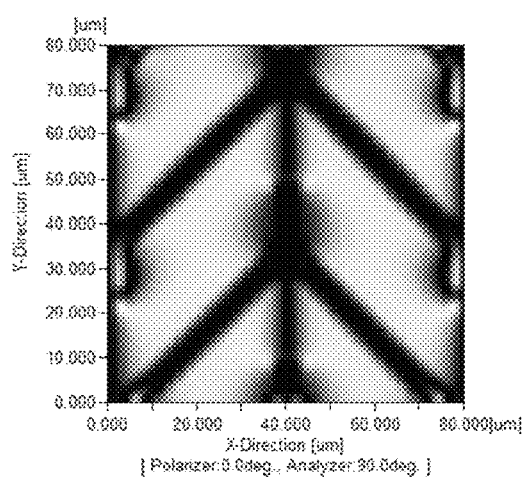
FIG. 8A is an image showing the calculation result of the alignment texture of the liquid crystal display apparatus of the modification example.

In the liquid crystal display apparatus of this modification example, Sw1 is set to 12 μm, Sw2 is set to 5 μm, and Ty is set to 20 μm. All other conditions are set as described above, and the results of calculating the alignment texture are illustrated in FIG. 8A. In this modification example as well, the occurrence of dark lines is found to be suppressed. It should be noted that simulation confirmed that, when Sw2 is set greater than Sw1, that is, when the slit width is set to gradually increase toward the ends on the side not connected to the first areas of the openings 18a and 18b, the occurrence of dark lines is similarly suppressed. Based on these results, it is apparent that a long-side edge of the second areas may be inclined rather than parallel to the Y direction (longitudinal direction of the second areas.)

In the plurality of openings 18a and the plurality of openings 18b illustrated in FIG. 7B, the shape of the ends of the second areas of the openings 18a and the openings 18b on the side not connected to the first areas are bent compared to that of the openings (refer to FIGS. 2A to 2C) of the first embodiment described above. Specifically, the end of each of the second areas has two edges that are not parallel to either the X direction or the Y direction. It should be noted that the difference in the shape of the second areas of the openings 19a and the openings 19b is the same as that of the openings 18a and the openings 18b.

Figure 8B:
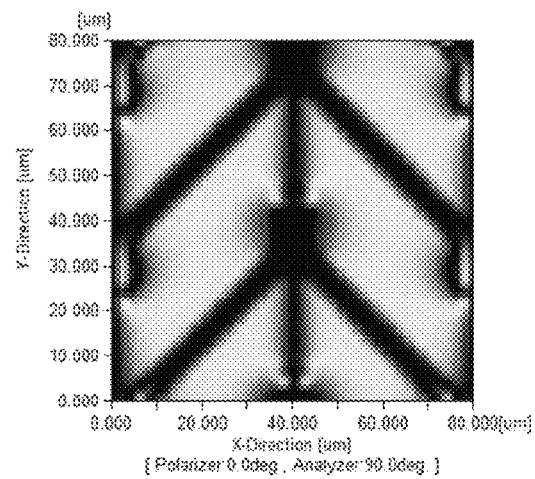
FIG. 8B is an image showing the calculation result of the alignment texture of the liquid crystal display apparatus of the modification example.

In the liquid crystal display apparatus of this modification example, Ty is set to 20 μm, the end of each of the second areas is established as two edges (having a vertex angle of 90 degrees) that form a 45 degree angle with respect to the X direction and the Y direction, and all other conditions are set as described above. FIG. 8B illustrates the results of calculating the alignment texture. In this modification example as well, the occurrence of dark lines is found to be suppressed. It should be noted that the angle (vertex) formed by the two edges of each end does not need to be 90 degrees, and may be an obtuse angle or an acute angle. Further, each end may be arc shaped, such as semicircular.

Figures 9A, 9B:
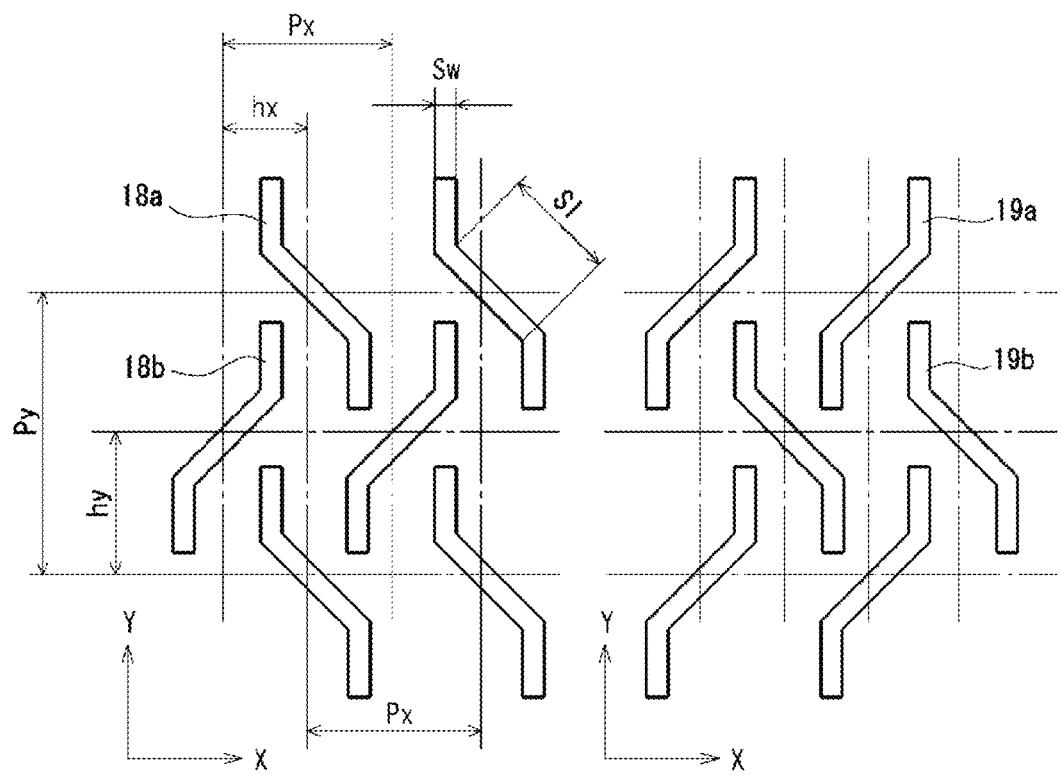
FIG. 9A is a plan view illustrating the structure of the first openings.
FIG. 9B is a plan view illustrating the structure of the second openings.
Figure 9C:
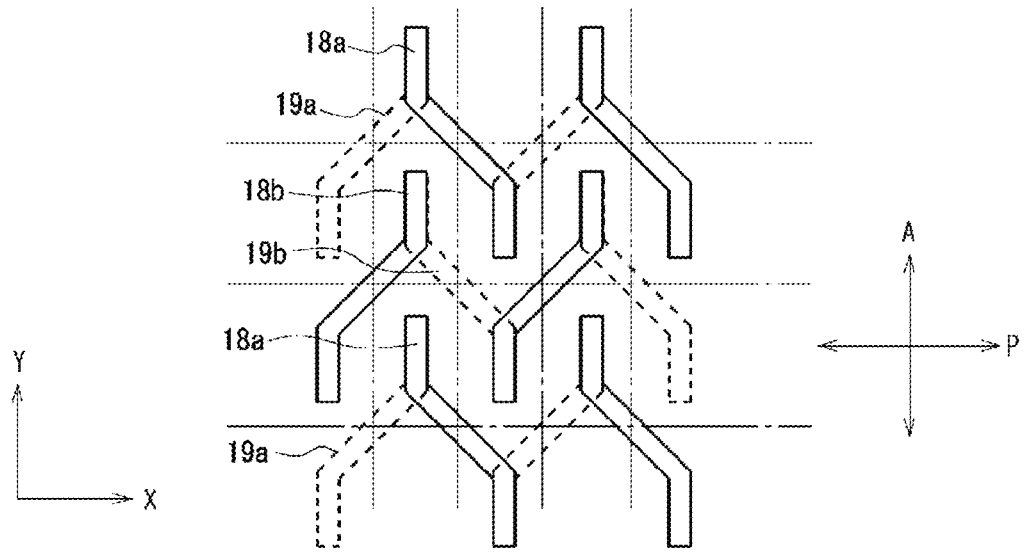
FIG. 9C is a plan view illustrating the first openings and the second openings overlapped.

FIGS. 9A to 9C are respectively a plan view illustrating the structure of the openings of the liquid crystal display apparatus of another modification example. Specifically, FIG. 9A is a plan view illustrating the structure of the first openings, FIG. 9B is a plan view illustrating the structure of the second openings, and FIG. 9C is a plan view illustrating the first openings and the second openings overlapped. It should be noted that the basic configuration of the liquid crystal display apparatus is the same as that of the first embodiment described above (refer to FIG. 1). And it should be noted that each of these drawings is a plan view as viewed from the first substrate 11 side, and illustrates a few of the many openings that exist.

As illustrated in FIG. 9A, the plurality of openings 18a and the plurality of openings 8b, compared to the openings (refer to FIGS. 2A to 2C) of the first embodiment described above, differ in that the openings 18a and the openings 18b comprise a third area in addition to the first area and the second area. Specifically, the openings 18a each comprise the substantially rectangular first area that extends in the direction 45 degrees clockwise in relation to the X direction, the substantially rectangular second area that extends parallel to the Y direction, and the substantially rectangular third area that similarly extends in the Y direction. The end on the upper side in the drawing of the first area and the end on the lower side in the drawing of the second area are connected, and the end on the lower side in the drawing of the first area and the end on the upper side in the drawing of the third area are connected. On the other hand, the openings 18b each comprise the substantially rectangular first area that extends in the direction 45 degrees counterclockwise in relation to the X direction, the substantially rectangular second area that extends parallel to the Y direction, and the substantially rectangular third area that similarly extends in the Y direction. The end on the upper side in the drawing of the first area and the end on the lower side in the drawing of the second area are connected, and the end on the lower side in the drawing of the first area and the end on the upper side in the drawing of the third area are connected. Further, as illustrated in FIG. 9B, the openings 19a have the same shape as that of the openings 18b described above, and the openings 19b have the same shape as that of the openings 18a described above.

As illustrated in FIG. 9C, the openings 18a and the openings 19a are disposed so that the respective second areas of one opening 18a and one opening 19a overlap in the planar view; the respective third areas of one opening 18a and one opening 19a overlap in the planar view, and the longitudinal directions of the respective first areas form a substantially 90 degree angle. Then, the openings configured by combining one opening 18a and one opening 19a are arranged along the X direction. The arrangement of the openings 18b and the openings 19b is also the same.

Further, the openings configured by combining one opening 18a and one opening 19a, and the openings configured by combining one opening 18b and one opening 19b are arranged adjacent to each other along the Y direction. In this embodiment, the second areas and the third areas of the openings 18a and 19a are disposed at a predetermined spacing from (that is, do not overlap with) the openings 18b and 19b disposed on the upper side in the drawing of these second areas. Similarly, in this embodiment, the second areas and the third areas of the openings 18b and 19b are disposed at a predetermined spacing from (that is, do not overlap with) the openings 18*a* and 19*a* disposed on the upper side in the drawing of these second areas.

According to the liquid crystal display apparatus of such a modification example as well, the graininess in the appearance of the display part caused by the occurrence of irregular dark lines is decreased, making it possible to improve the display quality.

Second Embodiment

Figures 10A, 10B:
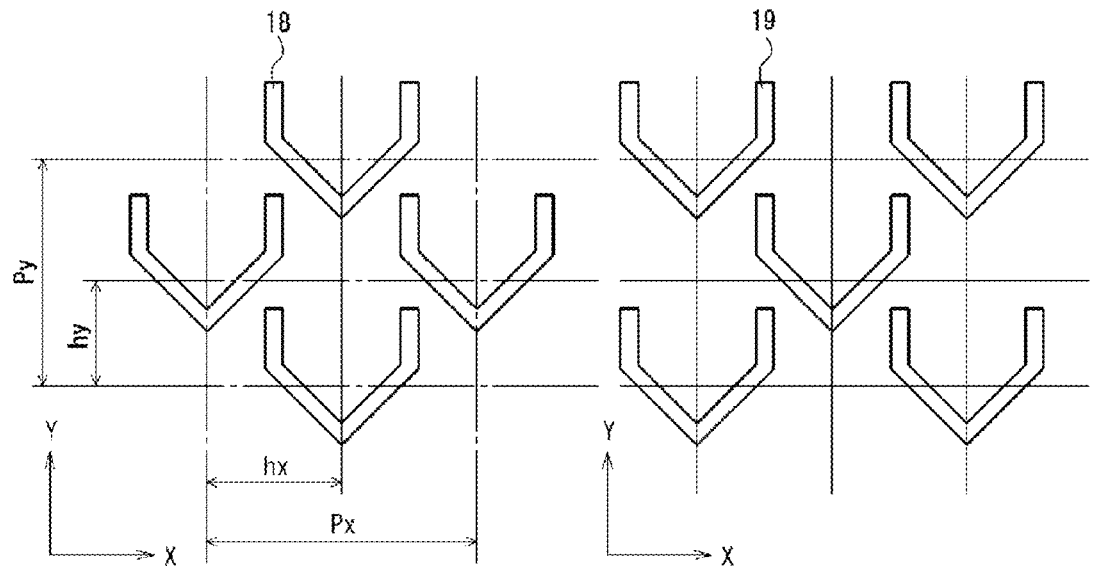
FIG. 10A is a plan view illustrating the structure of the first openings of the liquid crystal display apparatus of the second embodiment.
FIG. 10B is a plan view illustrating the structure of the second openings of the liquid crystal display apparatus of the second embodiment.
Figure 10C:
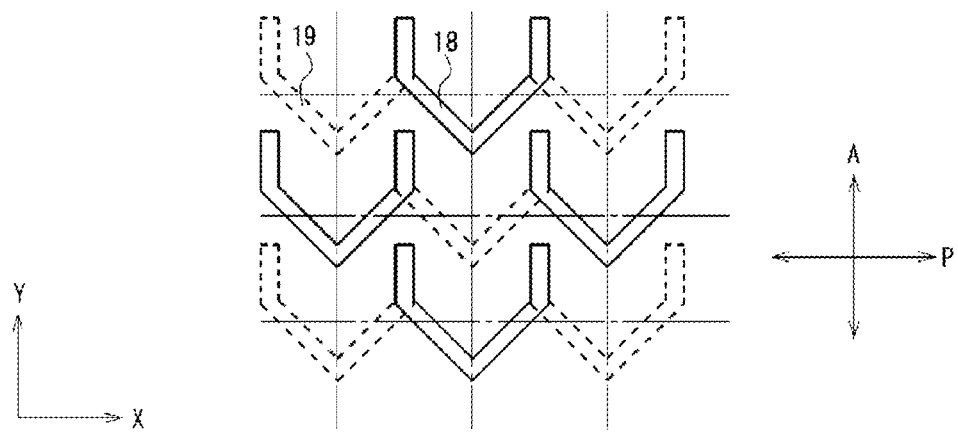
FIG. 10C is a plan view illustrating the first openings and the second openings of the liquid crystal display apparatus of the second embodiment overlapped.

The following describes the second embodiment of the liquid crystal display apparatus. It should be noted that the basic configuration of the liquid crystal display apparatus is the same as that of the first embodiment described above (refer to FIG. 1), and thus detailed descriptions thereof will be omitted. FIGS. 10A to 10C are respectively a plan view illustrating the structure of the openings of the liquid crystal display apparatus of the second embodiment. Specifically, FIG. 10A is a plan view illustrating the structure of the first openings, FIG. 10B is a plan view illustrating the structure of the second openings, and FIG. 10C is a plan view illustrating the first openings and the second openings overlapped. It should be noted that each of these drawings is a plan view as viewed from the first substrate 11 side, and illustrates a few of the many openings that exist.

As illustrated in FIG. 10A, the first openings 18 are arranged at a constant pitch Px in the X direction in the drawing, and at a constant pitch Py along the Y direction in the drawing. Further, a position of each of the first openings 18 is disposed shifted by the half pitch hx per row when the arrangement is viewed in the X direction, and a position of each of the first openings 18 is disposed shifted by the half pitch hy per column when the arrangement is viewed in the Y direction. In other words, the first openings 18 are disposed in a check pattern. Further, as illustrated in FIG. 10B, the second openings 19 are disposed in the same check pattern as the first openings 18.

As illustrated in FIG. 10A, the first openings 18 each comprise the substantially rectangular first area that extends in the direction 45 degrees clockwise in relation to the Y direction, the substantially rectangular second area that extends in the direction 45 degrees counterclockwise in relation to also the Y direction, and two substantially rectangular third areas that both extends parallel to the Y direction. The end on the lower side in the drawing of the first area and the end on the lower side in the drawing of the second area are connected, the end on the upper side in the drawing of the first area and the end of one of the third area are connected, and the end on the upper side in the drawing of the second area and the end of the other third area are connected. Further, as illustrated in FIG. 10B, the first area, the second area, and the third areas of the second openings 19 are connected as that of the first openings 18.

As illustrated in FIG. 10A and FIG. 10B, the first openings 18 and the second openings 19 are disposed shifted by the half pitch hx from each other in the X direction, and shifted by the half pitch hy from each other in the Y direction. Then, as illustrated in FIG. 10C, the first openings 18 and the second openings 19 are disposed so that the respective third areas of one first opening 18 and one second opening 19 adjacent to each other in the X direction overlap in the planar view. Furthermore, in this embodiment, the first openings 18 and the second openings 19 are disposed at a predetermined interval so that the other end sides of the respective third areas (the ends on the side not connected to the first area or the second area) do not overlap with the first openings 18 or the second openings 19 disposed on the upper side in the drawing of these third areas.

According to the liquid crystal display apparatus of the second embodiment as well, the graininess in the appearance of the display part caused by the occurrence of irregular dark lines is decreased, making it possible to improve the display quality.

Figures 11A, 11B:
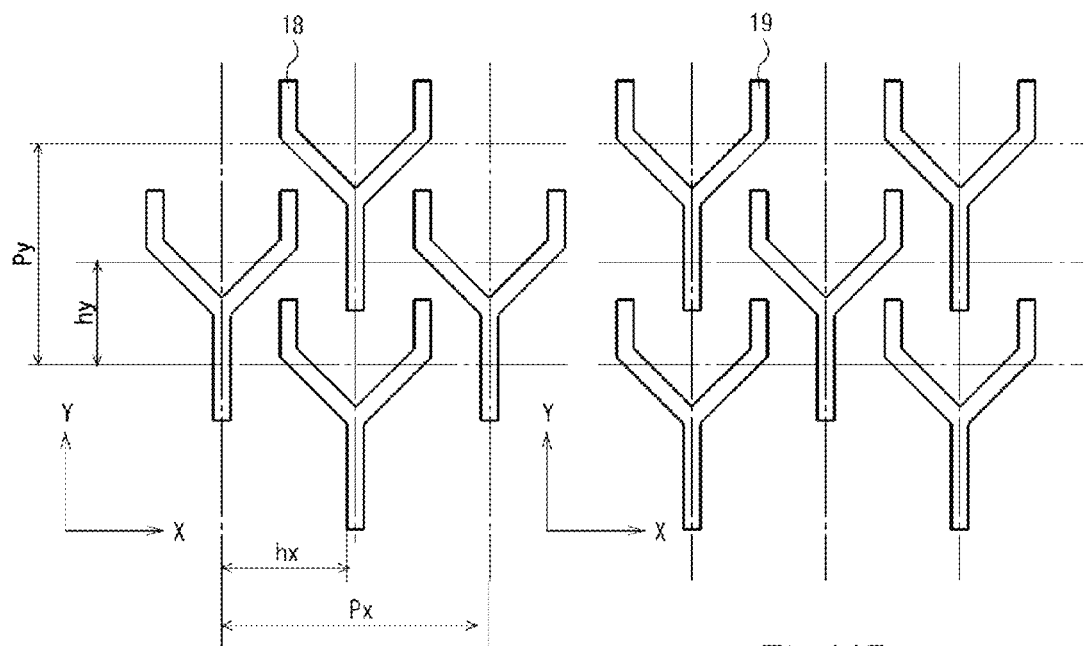
FIG. 11A is a plan view illustrating the structure of the first openings of the liquid crystal display apparatus of another modification example.
FIG. 11B is a plan view illustrating the structure of the second openings of the liquid crystal display apparatus of another modification example.
Figure 11C:
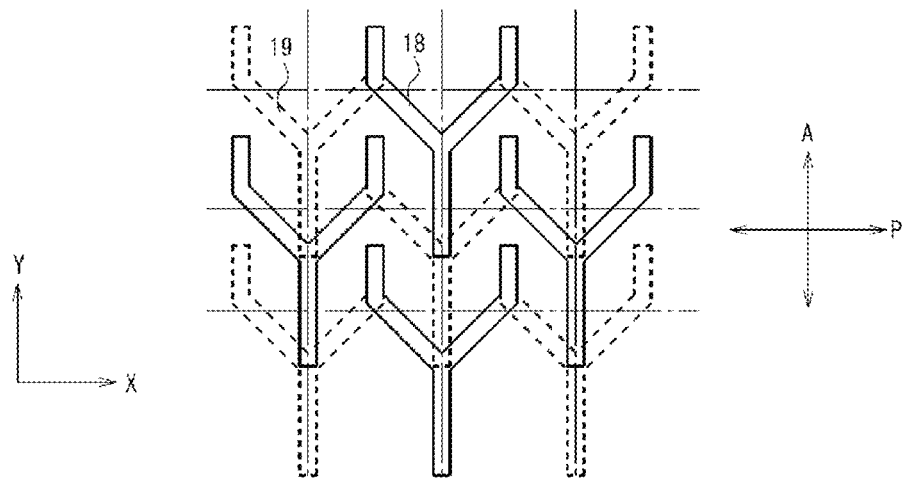
FIG. 11C is a plan view illustrating the first openings and the second openings of the liquid crystal display apparatus of another modification example overlapped.

FIGS. 11A to 11C are respectively a plan view illustrating the structure of the openings of the liquid crystal display apparatus of another modification example. Specifically, FIG. 11A is a plan view illustrating the structure of the first openings, FIG. 11B is a plan view illustrating the structure of the second openings, and FIG. 11C is a plan view illustrating the first openings and the second openings overlapped. It should be noted that the basic configuration of the liquid crystal display apparatus is the same as that of the first embodiment described above (refer to FIG. 1). And it should be noted that each of these drawings is a plan view as viewed from the first substrate 11 side, and illustrates a few of the many openings that exist.

The first openings 18 illustrated in FIG. 11A differ from the first openings 18 illustrated in FIG. 10A described above in that a substantially rectangular fourth area that is connected to the respective ends on the lower side in the drawing of the first area and the second area and extends parallel to the Y direction has been further added. Similarly, the second openings 19 illustrated in FIG. 11B differ from the second openings 19 illustrated in FIG. 10B described above in that a substantially rectangular fourth area that is connected to the respective ends on the lower side in the drawing of the first area and the second area and extends parallel to the Y direction has been further added. The fourth areas, as illustrated, are disposed so as to form 135 degree angles with respect to the first areas and the second areas.

As illustrated in FIG. 11C, the first openings 18 and the second openings 19 are disposed so that the respective third areas of one first opening 18 and one second opening 19 adjacent to each other in the X direction overlap in the planar view. Further, the first openings 18 and the second openings 19 are disposed at a predetermined interval so that the other end sides of the respective third areas (the ends on the side not connected to the first area or the second area) do not overlap with the first openings 18 or the second openings 19 disposed on the upper side in the drawing of these third areas. Furthermore, the fourth areas of the first openings 18 are each disposed so as to overlap with the respective ends of the first area and the second area of one second opening 19. Similarly, the fourth areas of the second openings 19 are each disposed so as to overlap with the respective ends of the first area and the second area of one first opening 18. It should be noted that the fourth area of each of the first openings 18 and the fourth area of each of the second openings 19 do not overlap.

According to the liquid crystal display apparatus of such a modification example as well, the graininess in the appearance of the display part caused by the occurrence of irregular dark lines is decreased, making it possible to improve the display quality.

Figures 12A, 12B:
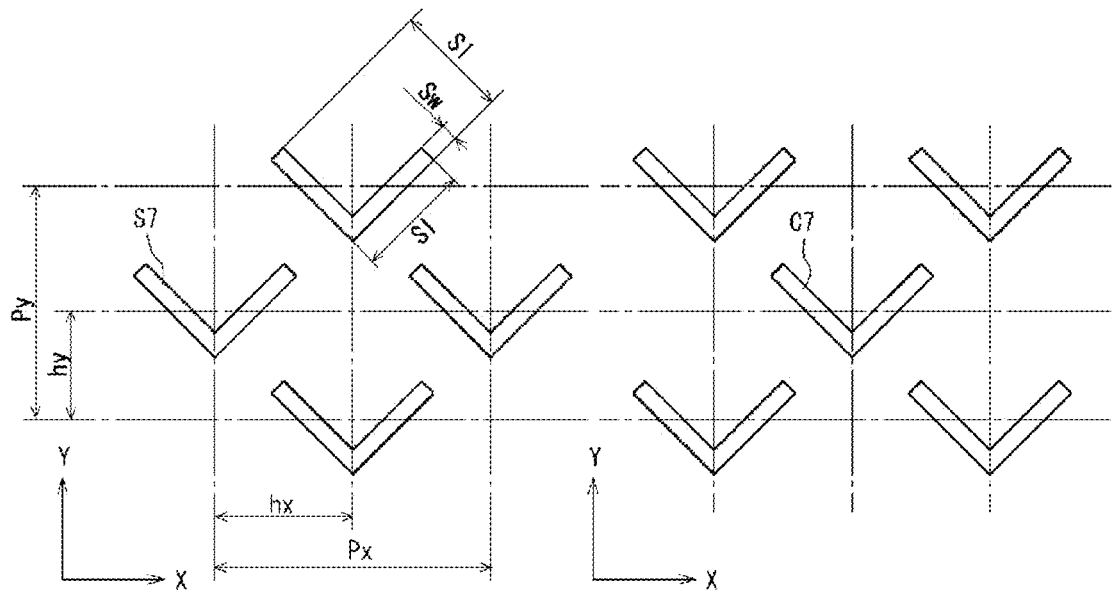
FIG. 12A is a plan view illustrating the structure of the openings provided to the first substrate of the liquid crystal display apparatus of the comparison example 3.
FIG. 12B is a plan view illustrating the structure of the openings provided to the second substrate of the liquid crystal display apparatus of the comparison example 3.
Figure 12C:
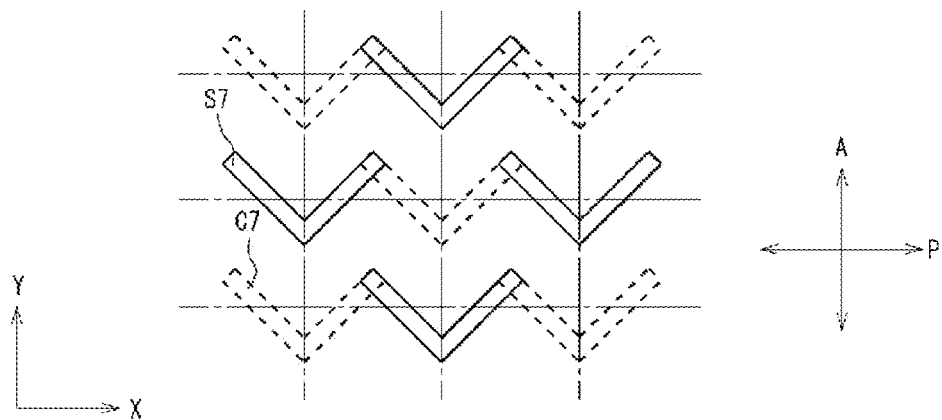
FIG. 12C is a plan view illustrating the first openings and the second openings overlapped.

FIGS. 12A to 12C are respectively a plan view illustrating the structure of the openings of the liquid crystal display apparatus of the comparison example 3. Specifically, FIG. 12A is a plan view illustrating the structure of the openings provided to the first substrate of the liquid crystal display apparatus of the comparison example 3, FIG. 12B is a plan view illustrating the structure of the openings provided to the second substrate of the liquid crystal display apparatus of the comparison example 3, and FIG. 12C is a plan view illustrating the first openings and the second openings overlapped. It should be noted that the basic configuration of the liquid crystal display apparatus is the same as that of the first embodiment described above (refer to FIG. 1). And it should be noted that each of these drawings is a plan view as viewed from the first substrate 11 side, and illustrates a few of the many openings that exist.

As illustrated in FIG. 12A, a plurality of openings S7 are provided to the first electrode 13 of the first substrate 11. The openings S7 each comprise an area having a longitudinal direction directed in a direction 45 degrees clockwise in relation to the Y direction, and an area having a longitudinal direction directed in a direction 45 degrees counterclockwise in relation to the Y direction, and these areas are connected at one end. The openings S7 are arranged at the pitch Px along the X direction, and at the pitch Py along the Y direction in the drawing. The length Sl of the areas of the openings S7 is defined as a length in the longitudinal direction, and the width Sw is defined as a length in the short direction of each area. Further, as illustrated in FIG. 12B, the openings C7 have the same shape as that of the openings S7 described above, and are disposed in the same way as the opening S7. It should be noted that while the length and the width of the openings C7 are the same as those of the openings S7, the width may be different.

As illustrated in FIG. 12A and FIG. 12B, the openings S7 and the openings C7 are disposed shifted by the half pitch hx from each other in the X direction, and shifted by the half pitch hy from each other the Y direction. Then, as illustrated in FIG. 12C, the openings S7 and the openings C7 are disposed so that the ends of one opening S7 and one opening C7 adjacent to each other in the X direction overlap in the planar view. Further, the openings S7 and the openings C7 are disposed so as to not overlap in the Y direction.

According to the liquid crystal display apparatus of the comparison example 3, similar to the other comparison examples, the occurance of the irregular dark lines conceivably causes the occurrence of graininess in the appearance of the display part.

Note that this invention is not limited to the subject matter of the foregoing embodiments, and can be implemented by being variously modified within the scope of the gist of the present invention.

What is claimed is:

1. A liquid crystal display apparatus comprising:
  a first substrate and a second substrate disposed facing each other;
  a first electrode provided to the first substrate;
  a second electrode provided to the second substrate, and
  a vertical alignment type liquid crystal layer provided between the first substrate and the second substrate; wherein:
  the first electrode comprises a plurality of first openings and the second electrode comprises a plurality of second openings;
  the plurality of first openings comprises a plurality of third openings each having a first area that extends in a direction 45 degrees clockwise in relation to a first direction, and a second area that extends in a second direction orthogonal to the first direction, in a planar view; and a plurality of fourth openings each having a first area that extends in a direction 45 degrees counterclockwise in relation to the first direction, and a second area that extends in the second direction, in the planar view;
  the plurality of second openings comprises a plurality of fifth openings each having a first area that extends in a direction 45 degrees counterclockwise in relation to a first direction, and a second area that extends in the second direction, in a planar view; and a plurality of sixth openings each having a first area that extends in a direction 45 degrees clockwise in relation to the first direction, and a second area that extends in the second direction, in the planar view;
  the plurality of third openings and the plurality of fifth openings are alternately disposed at a predetermined interval along the first direction so that the second areas of one third opening and one fifth opening adjacent to each other overlap, in the planar view;
  the plurality of fourth openings and the plurality of sixth openings are alternately disposed at a predetermined interval along the first direction so that the second areas of one fourth opening and one sixth opening adjacent to each other overlap, in the planar view;
  a column along the first direction formed by the plurality of third openings and the plurality of fifth openings, and a column along the first direction formed by the plurality of fourth openings and the plurality of sixth openings are disposed adjacent to each other in the second direction.

2. The liquid crystal display apparatus according to claim 1, wherein:
  the plurality of third openings and the plurality of fifth openings are disposed so that ends of the first areas of one third opening and one fifth opening adjacent to each other overlap, in the planar view, and
  the plurality of fourth openings and the plurality of sixth openings are disposed so that ends of the first areas of one third opening and one fifth opening adjacent to each other overlap, in the planar view.

3. A liquid crystal display apparatus comprising:
  a first substrate and a second substrate disposed facing each other;
  a first electrode provided to the first substrate;
  a second electrode provided to the second substrate, and
  a vertical alignment type liquid crystal layer provided between the first substrate and the second substrate; wherein:
  the first electrode comprises a plurality of first openings and the second electrode comprises a plurality of second openings;
  the plurality of first openings each include a first area that extends in a direction 45 degrees clockwise in relation to a second direction, a second area that extends in a direction 45 degrees counterclockwise in relation to the second direction, and two third areas that extend in the second direction, in a planar view, one end of the first area and one end of the second area being connected to each other, one of the third areas being connected to the other end of the first area, and one of the third areas being connected to the other end of the second area;
  the plurality of second openings each include a first area that extends in a direction 45 degrees clockwise in relation to a second direction, a second area that extends in a direction 45 degrees counterclockwise in relation to the second direction, and two third areas that extend in the second direction, in a planar view, one end of the first area and one end of the second area being connected to each other, one of the third areas being connected to the other end of the first area, and one of the third areas being connected to the other end of the second area;
  the plurality of first openings and the plurality of second openings are disposed in a check pattern in the planar view, disposed by shifting arrangement pitches in the first direction by a half pitch from each other, and alternately disposed at a predetermined interval along the first direction so that the third areas of each first opening and second opening adjacent to each other overlap.

4. The liquid crystal display apparatus according to claim 3, wherein:
the plurality of first openings comprises a fourth area that extends in the second direction, the fourth area being connected to the one end of the first area and the one end of the second area, and
the plurality of second openings comprises a fourth area that extends in the second direction, the fourth area being connected to the one end of the first area and the one end of the second area.

* * * * *